Figure 1:
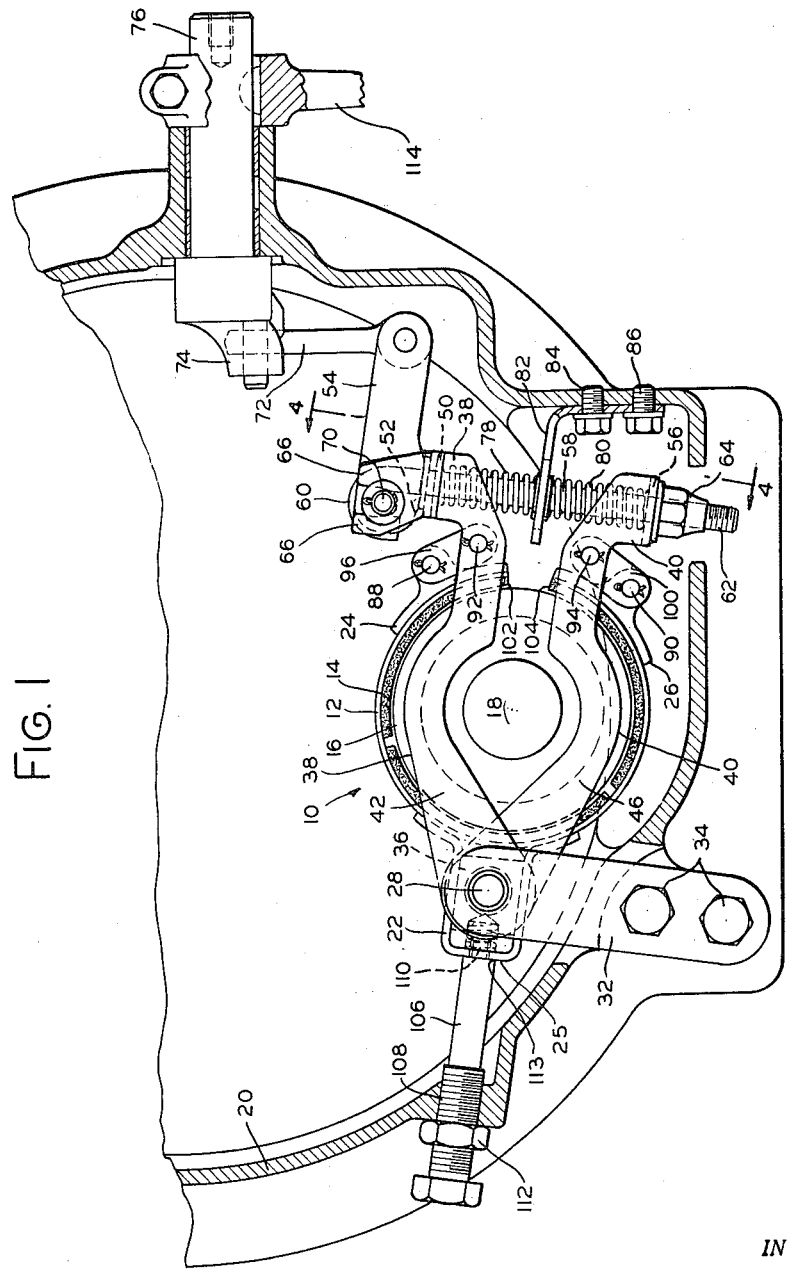

Dec. 22, 1959 W. E. WHITE 2,918,145
BAND BRAKE

Filed Oct. 30, 1956 4 Sheets-Sheet 3

INVENTOR.
WILLIAM E. WHITE
BY
ATTY.

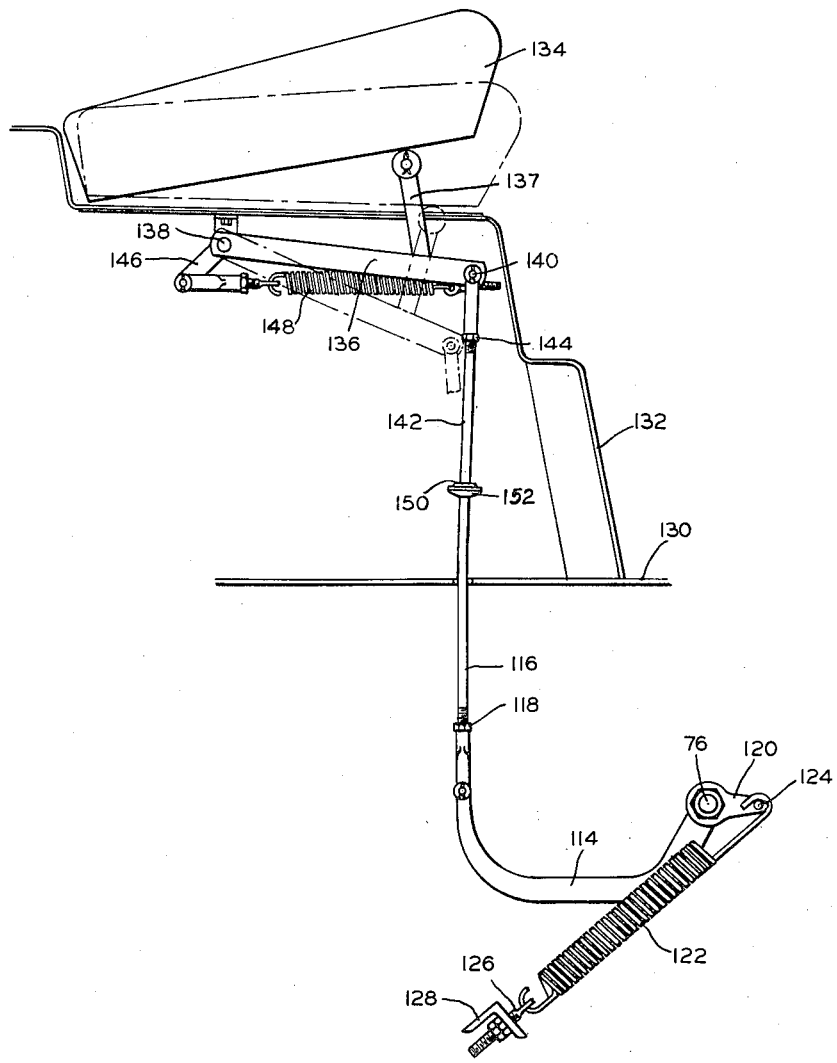

United States Patent Office 2,918,145
Patented Dec. 22, 1959

2,918,145

BAND BRAKE

William E. White, Buchanan, Mich., assignor to Clark Equipment Company, a corporation of Michigan Application October 30, 1956, Serial No. 619,223

4 Claims. (Cl. 188—77)

My present invention relates to brakes, and more particularly, to operating mechanisms for brakes of the band type.

This invention is especially useful for relatively small band brakes, but it may be employed with band brakes of any size.

A band brake may comprise a metal band with an internal friction lining located around a brake drum. Such a brake is applied by exerting tension on one or both of the ends of the band to cause the friction material to engage the brake drum and exert a stopping force thereon. It is desirable that the tensile forces on the ends of the band be exerted tangentially to the drum to promote maximum efficiency and uniform wear of the band. As a practical matter, however, it is necessary ordinarily to have the forces applied at some distance from the band and along a line not parallel to the tangent because of the desirability of using a single operating mechanism for both ends of the band and the necessity for keeping the operating mechanism within reasonable bounds of both size and cost.

In many band brakes in use heretofore brackets are connected near the ends of the band, and an operating mechanism is provided which acts on these brackets, moving them toward and away from each other to apply and release the brake. In known mechanisms of this type, the arrangement of parts frequently is such as to produce a considerable overturning moment on the bracket which tends to tear it away from the band and also tends to cause the extreme end of the lining to tend to dig into the drum, thus producing excessive lining wear at the extreme end of the lining. It is because the forces in such a band brake operating mechanism are applied on the bracket at a considerable distance from the band, and in a direction other than parallel to the tangent that the overturning action and uneven lining wear occur.

The object of the present invention is to provide a simple and inexpensive operating mechanism for a band brake which eliminates, or at least minimizes, the deficiencies discussed hereinbefore of other band brake mechanisms.

More specifically, it is an object of this invention to provide an operating mechanism of this type which exerts a pull on each end of the band in the most desirable direction and close to the band.

In carrying out my invention in one form I provide a band brake operating mechanism which includes a pair of bifurcated levers straddling the band and having the ends of their leg portions pivoted about a common axis near the mid-point of the band. The bifurcated levers extend adjacent the ends of the band respectively, and are connected to these ends. The operating mechanism for the brake is connected between the two bifurcated levers. This arrangement permits the pull on the band to be applied closer to the band and in a more nearly tangential direction than conventional mechanisms.

Figure 2:
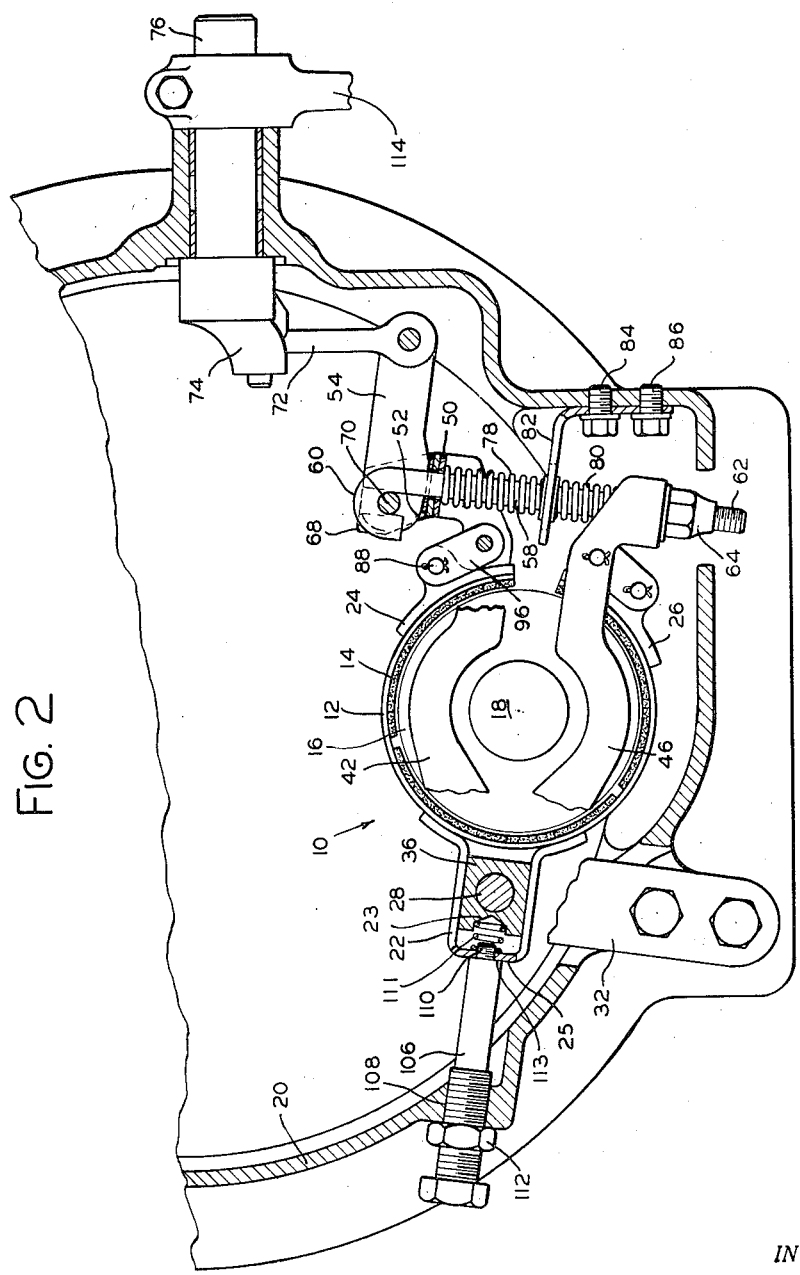
Figure 3:
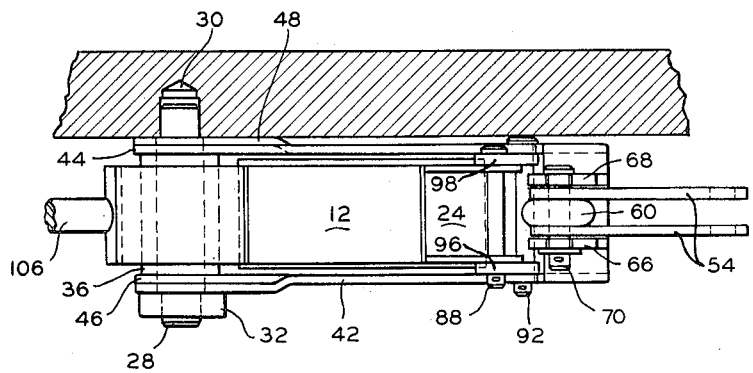
Figure 4:
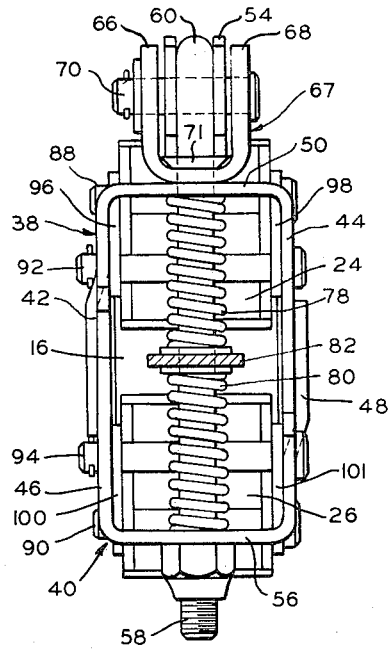

For a clearer and more complete understanding of my invention, reference should be had to the accompanying drawing in which Figure 1 is an end view of one preferred form of my brake mechanism, Figure 2 is a view similar to Figure 1 with certain parts omitted and other parts broken away to reveal certain details of the mechanism, Figure 3 is a top view of the mechanism, Figure 4 is a sectional view on an enlarged scale along the line 4—4 of Figure 1, and Figure 5 is a schematic view showing how this mechanism may be embodied in the parking brake for a vehicle.

Referring to the drawing, the numeral 10 in Figures 1 and 2 indicates generally a brake mechanism embodying the present invention. The brake 10 includes a metal band 12 having secured to the inner surface thereof in a suitable manner a lining 14 (illustrated as composed of three sections) of a known friction material. The brake band and lining are positioned around the periphery of a brake drum 16 which is mounted on the end of a shaft 18. In this particular example the shaft 18 projects from a housing 20, only a portion of which is illustrated herein, and this housing may, for example, house a vehicle transmission.

The band 12 has secured thereto an open metal bracket 22 which is positioned near the mid-point of the band and located symmetrically with respect to a horizontally disposed center line passing through the mid-point, through the center of shaft 18, and passing midway between the ends of the band. The ends of the band 12 are provided respectively with a pair of brackets 24 and 26 which are secured to the outer surface of the band in a suitable manner.

Within the bracket 22 is an anchor pin 28. This anchor pin is supported by the housing 20, extending between an opening 30 in the housing (see Figure 3) and a bracket 32 which is connected to a lower portion of the housing in a suitable manner such as by a pair of capscrews 34. A press fit preferably is provided between the anchor pin 28 and hole 30 to retain the anchor pin in position. Pin 28 extends through an opening in a rectangular block 36 which fits within the two horizontally disposed portions of bracket 22. The portion of the mechanism just described provides an anchor for operating levers of the brake mechanism and also a centering adjustment, and the latter function is described subsequently.

Two bifurcated levers 38 and 40 straddle the band 12 and drum 16 and have the left ends of their leg portions pivoted on anchor pin 28. As may be seen best in Figure 3, upper bifurcated lever 38 comprises a pair of leg portions 42 and 44, the former being located in front of the brake band, as seen in Figures 1 and 2, while the latter is behind the brake band. Lower bifurcated lever 40 comprises a pair of leg portions 46 and 48, with the former being located in front of the brake band and the latter behind. Preferably, the two bifurcated levers 38 and 40 are of identical construction so that a single design may be utilized for both parts merely by inverting one of them.

At the right, the two individual leg portions 42 and 44 are joined together to form the bifurcated lever 38, as illustrated best in Figure 4, by means of a bight portion 50. Preferably the leg portions 42 and 44 and the bight portion 50 are formed integrally from a single piece of metal by stamping or cutting out the correct shape and then bending the metal to the configuration illustrated. Bifurcated lever 40 has a corresponding structure including a bight portion 56, which connects leg portions 46 and 48. Extending between the two bight portions, through suitable openings therein, is a rod 58 having a hook portion 60 at the upper end, and a threaded portion 62 at the lower end with an adjusting nut 64 located thereon.

The right hand end of the lever 38 includes a U-shaped inverted bracket portion 67 secured to the upper surface of bight portion 50, and having a pair of upwardly projecting forked portions 66 and 68 located in front of and behind, respectively, hook portion 60. A pin 70 extends through portions 66, 60 and 68, being cradled in forked portions 66 and 68, while hook portion 60 exerts a downward force on the pin. Pin 70 is carried by a lever 54, which is made up of a pair of links as may be seen in Figure 3. Each of the links has a cam surface 52 along the lower left portion thereof, as may be seen best in Figure 2. As will be readily appreciated, when the right hand end of lever 54 is moved downwardly, the cam surface 52 exerts a downward force on lever 38, while pin 70, which is carried by lever 54 exerts an upward force on the hook portion 60 of rod 58 and thereby pulls upwardly on lower lever 40. A wear washer 71 may be provided on the top of the bight portion of bracket 67, if desired, for engagement by the cams. As illustrated in this typical example lever 54 is operated by a link 72 which connects it to a crank arm 74 which in turn is rotated by a shaft 76. An operating mechanism which may be used to operate shaft 76 is explained hereinafter.

The bifurcated levers 38 and 40 are biased apart by means of a pair of adjusting and return springs 78 and 80 which are positioned around rod 58 and between a fixed centering bracket 82 and the bight portions 50 and 56 of the respective levers. Bracket 82 may be secured in a suitable manner such as by a pair of cap screws 84 and 86 to the housing 20, this bracket being secured in a manner such that the horizontally disposed portion of the bracket lies on the center line bisecting the upper and lower portions of the band.

To translate the motion of the bifurcated levers into motion of the brake band 12, suitable linkages are provided between the lever arms and the respective brackets 24 and 26 at the ends of the band. As illustrated, these linkages comprise a pair of pins 88 and 90 extending respectively through the two brackets, a pair of pins 92 and 94 extending respectively through the individual legs of the two bifurcated levers, and a pair of connecting links for each end of the band. The links for the upper connection are indicated by the numerals 96 and 98, while links for the lower end of the band are indicated by the numerals 100 and 101.

It is apparent that as the levers 38 and 40 are moved toward each other a pull is exerted on both ends of the band 12 to apply the brake. This pull is exerted close to the band in each case, the force being exerted theoretically at the centers of pins 88 and 90, respectively. The direction of the pull on the upper end of the band is from the center of pin 88 on a line toward the center of pin 92, while the pull on the lower band is from the center of pin 90 toward the center of pin 94. These lines are approximately parallel to tangents to the brake drum at the points closest to pins 88 and 90. Thus, the present construction provides operating forces for the ends of the bands which are close to the bands and approximately parallel to tangents thereto. This construction provides efficient and uniform application of the brake and eliminates excessive wear at the extreme end portions 102 and 104 of the lining. At the same time, this construction minimizes the forces tending to tear brackets 24 and 26 away from the brake band 12. It will be appreciated that if the bifurcated levers were eliminated and brackets 24 and 26 were extended outwardly, to the right, far enough that the operating mechanism could be applied directly to these brackets, in the manner of many conventional mechanisms of this type, that the operating forces would be applied in a much less advantageous direction and much farther from the band with the result that there would be greater forces tending to tear the brackets away from the bands, less efficient brake operation would be provided, and there would be much greater wear at the extreme ends of the lining.

In a band brake of this type it is necessary to adjust the band so that the lining is out of contact, or at least has very light contact, with the drum when the brake is released. In the present construction this is accomplished by means of two adjustments. One of these adjustments is made by adjusting nut 64 upwardly or downwardly. This moves both of the bifurcated lever arms 38 and 40 and makes it possible to adjust for the proper clearance between the brake drum and the upper and lower portions of the lining. Inasmuch as the horizontally disposed portion of bracket 82 is on the center line, and any change in the location of nut 64 produces an equal compression or lengthening of both springs 78 and 80, the operation of nut 64 adjusts both of the bifurcated lever arms simultaneously.

The brake band is adjusted horizontally by means of an adjusting mechanism which includes rectangular block 36, bracket 22, an adjusting screw 106, and a compression spring 111. Spring 111 is located in a depression 23 in block 36 and bears against the bight portion 25 of bracket 22, thus tending to push band 12 to the left. Screw 106, which is adjustable in a tapped opening 108 in housing 20, opposes the spring 111, the screw 106 being provided with a pilot portion 110 which is located in an opening in bight portion 25 while the shoulder portion 113 of the screw bears against the bight portion. As screw 106 is threaded into or out of housing 20, the brake band is adjusted to the right or left in order to center it with respect to drum 16. The upper and lower horizontal portions of bracket 22 slide on rectangular block 36 during this adjustment operation. A lock nut 112 may be provided to hold adjusting screw 106 after the adjustment has been made.

I have illustrated in Figure 5 of the drawing one linkage mechanism which may be used for the operation of shaft 76 to apply and release the brake. In this case, a U-shaped lever arm 114 is connected to shaft 76, and the left end of lever 114 has a rod 116 screwed into the lever to provide an adjustable connection, a lock nut 118 being provided to maintain this connection during operation. A projection 120 at the right end of lever 114 provides for the connection of a brake applying spring 122 between a pin 124 carried by projection 120 and a hook member 126 which in this illustration is anchored to a fixed portion 128 of a vehicle.

The vehicle which is used herein for illustration is an industrial lift truck which has a fixed body portion 130 and a hood portion 132 which is hinged at the rear (not shown) so that the hood may be raised. On the hood portion 132 is located an operator's seat 134, and a mechanism is provided which raises this seat and applies the parking brake whenever the operator leaves his seat. The linkage employed to accomplish this includes an inverted T-shaped member 136 having an upwardly projecting portion 137 connected to the seat, which is pivotally connected at 138 to the hood and has a pivotal connection at 140 with an adjustable rod 142. A lock nut 144 is provided to secure the rod 142 in the proper location. A lever 146 is connected solidly to pin 138 which in turn is connected to member 136 so that lever 146 moves simultaneously with member 136. A spring 148 is connected between the lower end of lever 146 and a fixed portion of the hood 132. Thus, when the operator leaves his seat, spring 148 acting through lever 146 moves the right end of member 136 and the seat upwardly. The upward movement of the right end of member 136 allows member 142 to move upwardly and this, in turn, permits upward movement of rod 116 and a corresponding clockwise movement of lever 114. The latter permits brake applying spring 122 to rotate shaft 76 clockwise and apply the brake. A pair of curved heads 150 and 152 are located respectively on the ends of rods 142 and 116 to provide a connection between these two rods, the former being convex while the latter is concave. This type of connection allows rod 142 to be moved away from rod 116 when the hood 132 is raised, while the connection between these two is automatically restored when the hood is returned to the position shown in the drawing.

It will be readily appreciated that while I have described and illustrated my invention in one preferred form as a parking brake for a vehicle, that my invention is not limited to this application but may be used in a variety of ways. I intend to cover by the appended claims all modifications which fall within the true spirit and scope of my invention.

I claim:

1. A brake mechanism for a shaft extending from a housing, comprising a circular drum mounted on the shaft, a metal band having an internal lining of friction material positioned around the periphery of the said drum, an anchor and adjustment mechanism located near the mid-point of the said band including an anchor pin supported by the housing and adjustment means connected between the housing and the band for adjusting the band with respect to the said drum, a first bifurcated lever straddling the said band, the ends of the individual legs of the said bifurcated lever being pivoted on the said anchor pin and the other end of the first bifurcated lever being adjacent one end of the band, a second bifurcated lever straddling the said band, the ends of the legs of the said second bifurcated lever being pivoted on the said anchor pin also and the other end of the second bifurcated lever being adjacent the other end of the said band, two brackets connected to the said band one adjacent each end thereof, a first connecting link between the said first bifurcated lever and one of the said brackets extending approximately parallel to a tangent to the said drum at the closest point on the periphery thereof to the connection of said first link to its bracket, a second connecting link between the said second bifurcated lever and the other bracket extending approximately parallel to a tangent to the said drum at the closest point on the periphery thereof to the connection of the said second link to the said other bracket, and operating means located at the said other ends of the bifurcated levers, said operating means including a rod extending through openings in the said two levers and having an adjusting nut threaded on one end and a hook connection for a pivot pin on the other, an operating lever carrying the said pivot pin, the said operating lever having a cam surface in engagement with one of the said bifurcated levers whereby pivoting the operating lever pulls the two bifurcated levers together to apply the brake, and compression spring releasing means biasing the bifurcated levers apart located between the said bifurcated levers and around the said rod.

2. A brake mechanism for a shaft extending from a housing, comprising a circular drum mounted on the shaft, a metal band having an internal lining of friction material positioned around the periphery of the said drum, an anchor and adjustment mechanism located near the midpoint of the said band including an anchor pin supported by the said housing and screw adjustment means, the said screw adjustment means including a bracket secured to the said metal band, screw threads in the housing, a screw element operable in the said threads and engaging the said bracket, and a spring located between the said anchor and the said bracket and holding the latter in abutting relation to the said screw element, a first bifurcated lever straddling the said band, the ends of the individual legs of the said bifurcated lever being pivoted on the said anchor pin and the other end of the first bifurcated lever being adjacent one end of the band, a second bifurcated lever straddling the said band, the ends of the legs of the said second bifurcated lever being pivoted on the said anchor pin also and the other end of the second bifurcated lever being adjacent the other end of the said band, a pair of brackets connected to the said band adjacent the respective ends thereof, first connection means between the said first bifurcated lever and one of the said pair of brackets, second connection means between the said second bifurcated lever and the other of the pair of brackets, and operating means located at the said other ends of the bifurcated levers, said operating means including a rod extending through openings in the said two levers and having an adjusting nut threaded on one end and a hook connection for a pivot pin on the other, an operating lever carrying the said pivot pin, the said operating lever having a cam surface in engagement with one of the said bifurcated levers whereby pivoting the operating lever pulls the two bifurcated levers together to apply the brake, and a pair of releasing and adjusting springs located between the said bifurcated levers and around the said rod.

3. A brake mechanism for a shaft extending from a housing, comprising a circular drum mounted on the shaft, a metal band having an internal lining of friction material positioned around the periphery of the said drum, an anchor and adjustment mechanism located near the midpoint of the said band including an anchor pin supported by the said housing and a screw adjustment mechanism for adjusting the band with respect to the said drum, a first bifurcated lever straddling the said band, the ends of the individual legs of the said bifurcated lever being pivoted on the said anchor pin and the other end of the first bifurcated lever being adjacent one end of the band, a second bifurcated lever straddling the said band, the ends of the legs of the said second bifurcated lever being pivoted on the said anchor pin also and the other end of the second bifurcated lever being adjacent the other end of the said band, a pair of brackets connected to the said band adjacent the respective ends thereof, first connection means between the said first bifurcated lever and one of the said brackets, second connection means between the said second bifurcated lever and the other bracket, and operating means located at the said other ends of the bifurcated levers, said operating means including a rod extending through openings in the said two levers and having an adjusting nut threaded on one end and a hook connection for a pivot pin on the other, an operating lever carrying the said pivot pin, the said operating lever having a cam surface in engagement with one of the said bifurcated levers whereby pivoting the operating lever pulls the two bifurcated levers together to apply the brake, and a pair of return and adjusting springs located between the said bifrucated levers and around the said rod and bracket mounted on the housing and having a portion thereof located between the said two springs whereby to secure return forces for both ends of the said band and simultaneous adjustment of both of such ends.

4. A brake mechanism for a shaft extending from a housing, comprising a circular drum mounted on the shaft, a metal band having an internal lining of friction material positioned around the periphery of the said drum, an anchor and adjustment mechanism located at the midpoint of the said band including an anchor pin supported by the said housing and screw adjustment means for aiding in adjusting the said band and friction material to a desired relation with respect to said drum, the said screw adjustment means including a bracket secured to the said metal band, screw threads in the housing, a screw element operable in the said threads and engaging the said bracket, and a spring located between the said anchor and the said bracket and holding the latter in abutting relation to the said screw element, a first bifurcated lever straddling the said band, the ends of the individual legs of the said bifurcated lever being pivoted on the said anchor pin and the other end of the first bifurcated lever being adjacent one end of the band, a second bifurcated lever straddling the said band, the ends of the legs of the said second bifurcated lever being pivoted on the said anchor pin also and the other end of the second bifurcated lever being adjacent the other end of the said band, a pair of brackets connected to the said band adjacent the respective ends thereof, first connecting link means between the said first bifurcated lever and one of the said pair of brackets, second connecting link means between the said second bifurcated lever and the other of the said pair of brackets, each of the said connecting link means being arranged to exert a pull on the band by pulling on the respective bracket at a location closely adjacent to the drum and in a direction substantially parallel to a tangent to the drum at the closest part thereto, operating means located at the other ends of the said bifurcated levers, said operating means including a rod extending through aligned openings in the said two levers and having an adjusting nut threaded on one end and a hook connection for a pivot pin on the other, an operating lever carrying the said pivot pin, the said operating lever having a cam surface in engagement with one of the said bifurcated levers whereby pivoting the operating lever pulls the two bifurcated levers together to apply the brake, a pair of substantially identical releasing and adjusting springs located between the said bifurcated levers and around the said rod, and an additional bracket mounted on the housing and having a portion thereof located around the rod and between the said two springs with the said portion lying on a center line extending through the said midpoint and the center of the said drum and midway between the said ends of the band whereby the two springs provide uniform releasing pressure on their respective ends of the band and operation of the said adjusting nut simultaneously adjusts the portions of the said band on both sides of the said center line.

References Cited in the file of this patent

UNITED STATES PATENTS

| | | |
|---|---|---|
| 1,171,357 | Schmidt | Feb. 8, 1916 |
| 1,279,778 | Steen | Sept. 24, 1918 |
| 1,279,788 | Steen | Sept. 24, 1918 |
| 1,400,340 | Alborn | Dec. 13, 1921 |
| 1,595,762 | Dumble | Aug. 10, 1926 |
| 1,844,818 | Gattie | Feb. 9, 1932 |
| 2,090,100 | Bixby | Aug. 17, 1937 |
| 2,174,018 | Schaum | Sept. 26, 1939 |
| 2,295,224 | Le Tourneau | Sept. 8, 1942 |
| 2,468,252 | Borland | Apr. 26, 1949 |
| 2,678,703 | Williams et al. | May 18, 1954 |